(12) United States Patent
Dang et al.

(10) Patent No.: US 11,887,405 B2
(45) Date of Patent: Jan. 30, 2024

(54) DETERMINING FEATURES BASED ON GESTURES AND SCALE

(71) Applicant: Capital One Services, LLC, McLean, VA (US)

(72) Inventors: Steven Dang, Plano, TX (US);
Chih-Hsiang Chow, Coppell, TX (US);
Elizabeth Furlan, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 332 days.

(21) Appl. No.: 17/398,471

(22) Filed: Aug. 10, 2021

(65) Prior Publication Data
US 2023/0051467 A1 Feb. 16, 2023

(51) Int. Cl.
| G06K 9/62 | (2022.01) |
| G06V 40/20 | (2022.01) |
| G06V 10/40 | (2022.01) |
| G06V 40/16 | (2022.01) |
| G06F 18/21 | (2023.01) |
| G06V 10/25 | (2022.01) |
| G06V 10/778 | (2022.01) |
| G06V 10/82 | (2022.01) |
| G06V 40/10 | (2022.01) |
| G06V 40/18 | (2022.01) |

(52) U.S. Cl.
CPC ............ *G06V 40/28* (2022.01); *G06F 18/217* (2023.01); *G06V 10/25* (2022.01); *G06V 10/40* (2022.01); *G06V 10/778* (2022.01); *G06V 10/82* (2022.01); *G06V 40/103* (2022.01); *G06V 40/174* (2022.01); *G06V 40/18* (2022.01); *G06V 40/20* (2022.01)

(58) Field of Classification Search
None
See application file for complete search history.

(56) References Cited

U.S. PATENT DOCUMENTS

| 7,742,623 B1 | 6/2010 | Moon et al. |
| 7,921,036 B1 | 4/2011 | Sharma et al. |
| 8,219,438 B1 | 7/2012 | Moon et al. |

(Continued)

FOREIGN PATENT DOCUMENTS

| EP | 2325722 A1 | 5/2011 |
| WO | 2017100334 A1 | 6/2017 |
| WO | 2019069324 A1 | 4/2019 |

OTHER PUBLICATIONS

Yakhchi, "Learning Complex Users' Preferences for Recommender Systems." arXiv preprint arXiv:2107.01529 (2021). (Year: 2021).*

(Continued)

*Primary Examiner* — Feng Niu
(74) *Attorney, Agent, or Firm* — Banner & Witcoff, Ltd.

(57) ABSTRACT

A system, method, and computer-readable medium for associating a person's gestures with specific features of objects is disclosed. Using one or more image capture devices, a person's gestures and the location of that person in an environment is determined. Using determined distances between the person and objects in the environment and scales associated with features of those objects, the list of specific features in the person's field-of-view may be determined. Further, a facial expression of the person may be scored and that score associated with one or more specific features.

20 Claims, 8 Drawing Sheets

(56) References Cited

U.S. PATENT DOCUMENTS

| | | | |
|---|---|---|---|
| 8,355,958 B2* | 1/2013 | Fushimi | G06Q 30/0201 |
| | | | 705/26.9 |
| 8,433,612 B1 | 4/2013 | Sharma et al. | |
| 8,577,705 B1 | 11/2013 | Baboo et al. | |
| 8,676,937 B2 | 3/2014 | Rapaport et al. | |
| 10,049,281 B2 | 8/2018 | Verano et al. | |
| 10,210,560 B2 | 2/2019 | DeLuca | |
| 10,354,262 B1 | 7/2019 | Hershey et al. | |
| 10,360,571 B2 | 7/2019 | Garel et al. | |
| 10,573,134 B1 | 2/2020 | Zalewski et al. | |
| 10,769,445 B2* | 9/2020 | Truong | H04W 4/35 |
| 11,106,900 B2* | 8/2021 | Taniguchi | G06V 40/70 |
| 11,126,257 B2* | 9/2021 | Stent | G06F 3/013 |
| 2002/0116266 A1* | 8/2002 | Marshall | G06Q 10/10 |
| | | | 705/14.14 |
| 2009/0318773 A1 | 12/2009 | Jung et al. | |
| 2010/0174586 A1 | 7/2010 | Berg, Jr. et al. | |
| 2011/0085700 A1 | 4/2011 | Lee | |
| 2012/0143687 A1* | 6/2012 | Fushimi | G06Q 30/0255 |
| | | | 707/E17.109 |
| 2012/0290950 A1* | 11/2012 | Rapaport | H04L 51/52 |
| | | | 715/753 |
| 2013/0054576 A1 | 2/2013 | Karmarkar et al. | |
| 2015/0278585 A1 | 10/2015 | Laksono et al. | |
| 2016/0379225 A1 | 12/2016 | Rider et al. | |
| 2019/0043064 A1 | 2/2019 | Chin et al. | |
| 2019/0108561 A1* | 4/2019 | Shivashankar | G06F 17/18 |
| 2019/0317594 A1* | 10/2019 | Stent | G06V 10/143 |
| 2019/0318372 A1 | 10/2019 | Sorensen | |
| 2019/0332855 A1* | 10/2019 | Taniguchi | G06Q 30/02 |
| 2020/0082172 A1* | 3/2020 | Truong | G06F 3/013 |
| 2020/0118400 A1 | 4/2020 | Zalewski et al. | |
| 2020/0279279 A1 | 9/2020 | Chaudhuri | |
| 2021/0076002 A1* | 3/2021 | Peters | H04N 7/152 |

OTHER PUBLICATIONS

Jaiswal et al., "An intelligent recommendation system using gaze and emotion detection." (2018). (Year: 2018).*

Kong et al. "Human Action Recognition and Prediction: A Survey." arXiv preprint arXiv:1806.11230 (2018). (Year: 2018).*

Wegrzyn et al. "Mapping the emotional face. How individual face parts contribute to successful emotion recognition" PLOS ONE, https://doi.org/10.1371/journal.pone.0177239, May 11, 2017, pp. 1-15.

Sachan, Ankit, "Deep Learning-based Edge Detection in OpenCV", CV-Tricks.com, https://cv-tricks.com/opencv-dnn/edge-detection-hed/, Feb. 19, 2019, pp. 1-8.

* cited by examiner

DETERMINING FEATURES BASED ON GESTURES AND SCALE

FIELD OF USE

Aspects of the disclosure relate generally to using machine learning to determine potential customers' impressions of products.

BACKGROUND

Salespersons working in a retail environment may spend considerable time watching potential customers before engaging those customers in conversations. During those conversations, the salespersons often spend considerable time following up on the salespersons' interpretations of customers' reactions to a product. Conventional computer-based gesture monitoring solutions may identify how a user interacts with one of a plurality of objects. However, those interactions are based on immediate proximity to the object. Machine-learning models trained on these customer interactions are limited as not being able to distinguish between different aspects of the object.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may address these and other problems, and generally improve how computer-based gesture recognition systems are able to determine gestures and the features to which those gestures are directed. In additional aspects, based on the improvements in identifying the features, better interpretations associated with the gestures may be obtainable by scoring those interactions. These improved impressions may have the effect of improving users' experiences with computer-based gesture recognition systems and the results provided, thus reducing or eliminating time consumed by individuals attempting to guess what others are gesturing at and the impressions of those making the gestures. Possible use-cases may include situations having complex objects, each with multiple features, where persons lack the ability to verbally communicate effectively regarding their preferences for the various features and/or where the persons are not interested in providing their verbal comments on every feature of every object they encounter. For those responsible for providing services based on other persons' preferences, attempting to monitor each person for nuanced clues of their preferences and associating those preferences with a myriad of possible features can become a daunting task. One or more aspects are directed to aiding those monitoring others by integrating machine-learning tools with characterizations of the objects and features to improve interpretations of gestures and emotions and which features are relevant to the emotions. According to some aspects, these and other benefits may be achieved by classifying objects as having various features, of which some of those features are more readily commented upon at a distance while others are only commented upon while in close proximity to the features. By identifying a distance between a potential customer and that of a given object, the list of relevant features may be filtered to prioritize those features more often associated with the relative distance between the potential customer and the object.

According to some aspects, these and other benefits may be achieved by using a computer-implemented method that may comprise receiving, by a first device, image data comprising a person in an environment, wherein the environment comprises objects with each object comprising one or more features. The method may detect the person in the image data and determine a position of the person within the environment. The method may predict, via a machine learning model trained to recognize a line-of-sight, a general area of focus of the person and determine positions of the objects in the environment, and determine relative distances between the position of the person and the objects. The method may further comprise identifying, based on the predicted general area of focus, based on positions of the objects in the environment, and based on the relative distance between the position of the person and the objects, a collection of one or more features; recognizing, via a machine learning model trained to recognize gestures, one or more gestures, wherein each of the one or more gestures is associated with a timestamp; determining, based on the recognized one or more gestures and their associated timestamps, a specific area of focus of the person; and determining, based on the collection of one or more features and based on the specific area of focus, one or more specific features. The method may further comprise determining, based on a first gesture of the one or more recognized gestures of the person and the one or more specific features, specific features of interest to the person; determining, from the image data and based on a first timestamp associated with the first gesture, a facial expression of the person; generating, based on the facial expression of the person, a score associated with the specific features of interest to the person; and outputting, based on the score, an indication of the person's level of interest in the specific features of interest.

A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. As such, corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
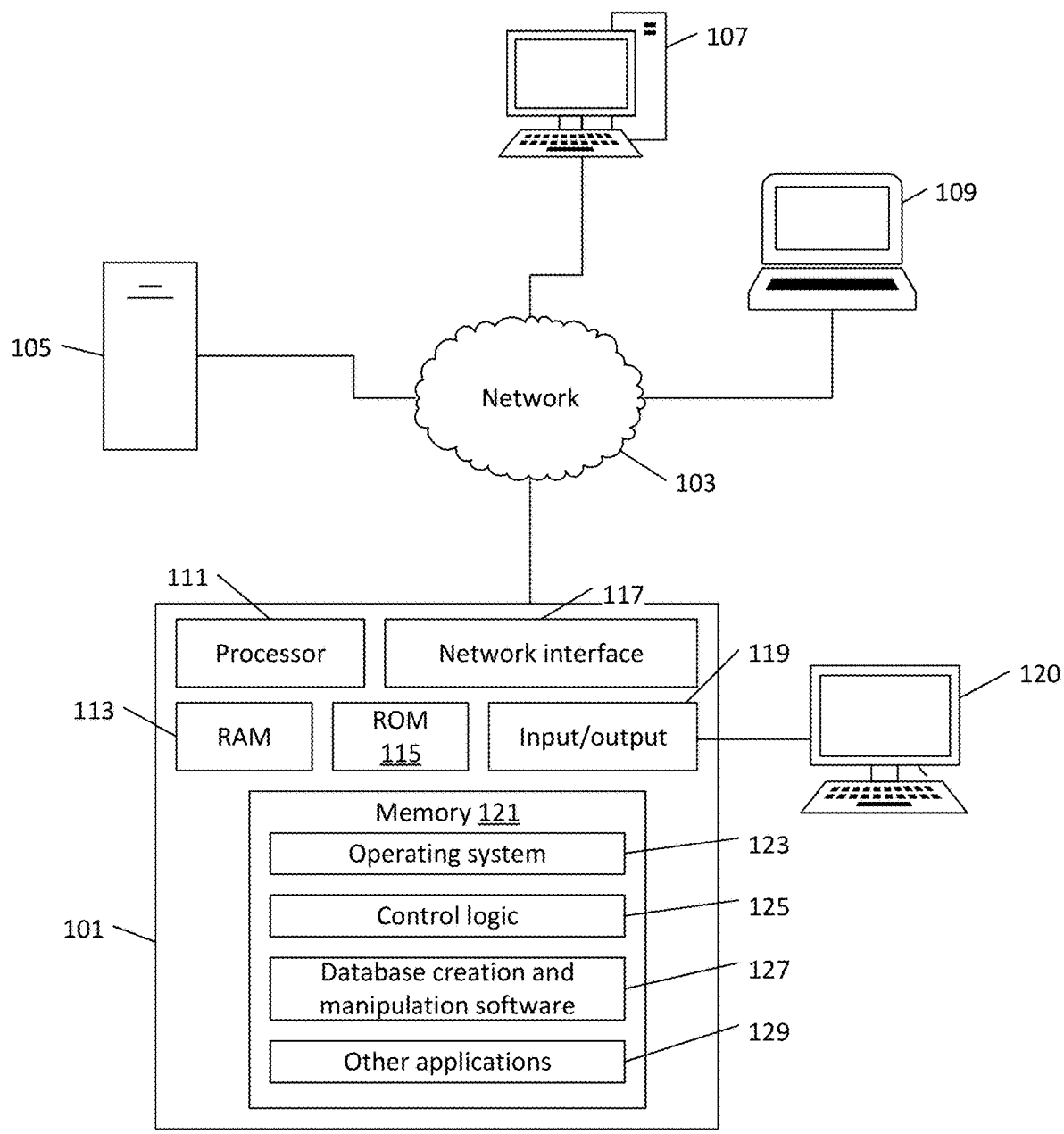
FIG. 1 depicts an example of a computing device and system architecture that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving the association of recognized gestures and/or specific features to which the recognized gestures relate. Through associating the gestures and/or specific features, the system may determine how an individual feels about specific features, liking individual features and disliking others. For instance, in elder care environments, some residents may have reduced verbal capabilities while still having preferences for some items in lieu of others. In sales environments, identifying and/or understanding how an individual feels about the specific features may be the difference between a potential customer who may return another day and a customer who completes a sale that day. From the customer's perspective, having sales staff that are better attuned to the wants and needs of the customer is a reason the customer may likely return to that establishment.

Determining a customer's intent is something skilled salesmen do effortlessly while other salesmen struggle with the same task. Skilled salesmen observe potential customers prior to actually engaging them in conversation. Being able to discern potential customers' likes and dislikes—before the conversation starts—allows those salespersons to tailor their conversations to the needs and wants of those specific customers. One or more aspects of the disclosure relate to using machine learning models to identifying those elusive needs and wants by synthesizing information regarding where customers are looking, identifying the objects associated with the customers' gaze and/or and gesticulations, determining, based on distances between the customers and the objects, features of those objects having a higher probability of relevance, and scoring, based on the gaze and/or gesticulations, those features. In short, one or more aspects relate to identifying what customers like and dislike and, possibly, features of interest that are not clearly associated with positive or negative emotions.

While existing shopping monitoring systems match a shopper's actions with a purchasable item, those monitoring systems are predicated on each item being effectively single dimensional objects. Aspects of the disclosure distinguish over existing approaches by appreciating that each object may include a variety of features and at least some of those features being more closely associated with a particular scale (micro scale or macro scale) relating to a distance between the person and the object. Based on the scale of the gestures and the distances to the objects, aspects of the disclosure permit filtering and classification (including a distance between a person and respective objects) to filter the features of the objects to better determine which feature of that object is to be associated with an observed gesture (or even emotion) of the person. Further, based on the distance to the object, some features may not be relevant to a person's gesture while others are relevant to the person's gesture.

It is appreciated that a number of use-cases may be helpful in explaining various aspects of the disclosure. For purposes of explanation, the disclosure provides examples of potential customers in a car dealership. Each vehicle in the dealership may represent an object and the aspects of each vehicle representing different features. Each feature may have a relative distance associated with it at which that feature is more often associated. For example, features such as the styling of the vehicle and the color of the vehicle may be associated with a macro scale, e.g., associated with features viewable from a distance. Features such as stitching of the interior upholstery, the feel of leather seats, and the layout of the gauges in the instrument cluster may be associated with a micro scale, e.g., associated with features viewable when in close proximity to the person. For example, when looking at a car in a showroom, a customer may be intrigued by a silhouette of the car and the detailed stitching of the upholstery. By including distance as a filter to selection of available features of the car, emotions relevant to only those filtered features are related to an observed emotion—e.g., happy emotions observed when a person is 10 meters from the car may be more readily associated with the silhouette of the car than with the upholstery's stitching. Likewise, negative emotions observed when the person is next to the car (or even in the car) may be more readily associated with the fit and finish (e.g., tolerances between exterior panels) than with the car's silhouette. Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, the computing device 101 may, in some embodiments, implement one or more aspects of the disclosure by reading and/or executing instructions and performing one or more actions based on the instructions. In some embodiments, the computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 101 may, in some embodiments, operate in a standalone environment. In others, the computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media. Additionally or alternatively, the computing device 101 and/or the network nodes 105, 107, and 109 may be a server hosting one or more databases.

As seen in FIG. 1, the computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of the computing device 101, control logic 125 for instructing the computing device 101 to perform aspects discussed herein, database creation and manipulation software 127 and other applications 129. Control logic 125 may be incorporated in and may be a part of database creation and manipulation software 127. In other embodiments, the computing device 101 may include two or more of any and/or all of these components (e.g., two or more processors, two or more memories, etc.) and/or other components and/or subsystems not illustrated here.

Devices 105, 107, 109 may have similar or different architecture as described with respect to the computing device 101. Those of skill in the art will appreciate that the functionality of the computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python or JavaScript. The computer executable instructions may be stored on a computer readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product. Having discussed several examples of computing devices which may be used to implement some aspects as discussed further below, discussion will now turn to a method for verifying an authentication capability for a service.

Figure 2:
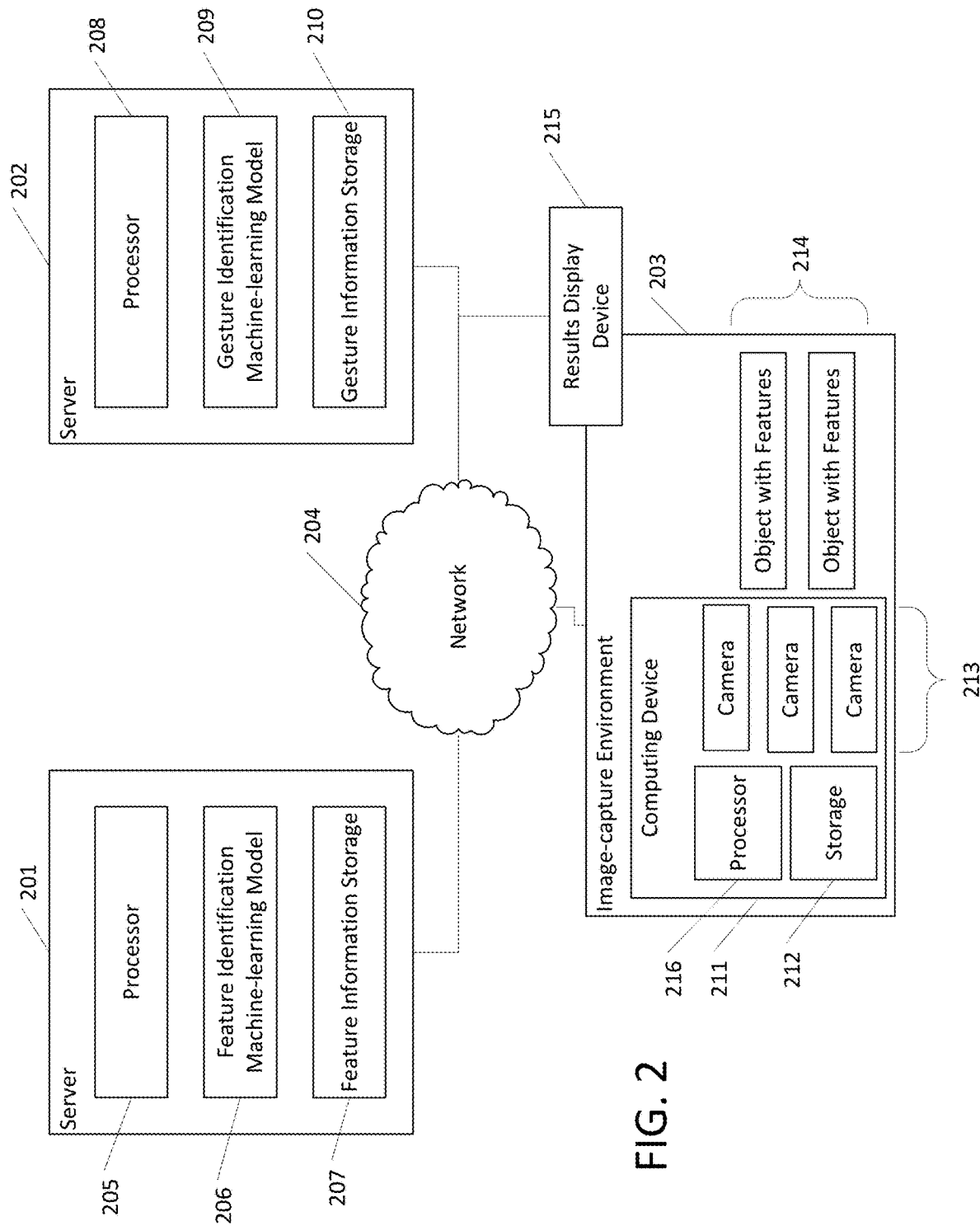
FIG. 2 depicts a block diagram of an environment in which systems and/or methods described herein may be implemented.

FIG. 2 is a block diagram of an environment in which systems and/or methods described herein may be implemented. As shown in FIG. 2, the environment may include servers 201 and 202 and an image-capture environment 203 connected by a network 204. The devices, servers, and network may interconnect via wired connections, wireless connections, or a combination of wired and wireless connections. The server 201 may be directed toward identifying features of objects in the environment 203. The server 202 may be directed toward identifying gestures of persons in the environment 203. The environment 203 may include a plurality of image capture devices that capture images of a person in the environment with the objects. The environment 203 may comprise a computing device 211 comprising a processor 216 configured to capture images and send them to server 201 and/or 202 for additional processing. The computing device 211 may include cameras 203 and storage 212 to store images from the cameras 203. The cameras 213 may cover the area in and/or around objects 214 (and their respective features). The images from cameras 213 may be processed by processor 216, by processors 205/208 in servers 201/202, or by processors in other servers. The processing of the images may comprise identifying persons in the images and their locations, identifying locations of objects in the images, and/or identifying, based on a direction a person is facing, a list of possible objects within that person's gaze. The server 201 may determine, using processor 205 and from the images captured in the image capture environment, possible features in the environment of interest to the person. The identification of the possible features may be performed by comparing the identified objects within the person's gaze with lists of features per object (e.g., with the lists of features per object retrieved from a feature information storage 207) and distances to the objects. Based on distances to the objects, the lists of features may be reduced, per object, to those features of the object more likely associated with the distance between the person and the object. Also, the server 202 may determine, using processor 208 and from the images captured in the image capture environment, possible gestures of persons within the environment 203. The identification of the possible gestures may be performed by comparing captured eye movements, body movements, arm movements, and the like and predicting, using a machine-learning model 209 trained on gesture-related datasets, what gesture or gestures are being exhibited by a given person. The identified features from server 201 and their timestamps may be correlated with identified gestures from server 202

Further, gesture-related information may be stored in gesture information storage 210 and that information may help fine tune results of the gesture identification machine-learning model 209. For instance, if the identified person in the images is male, the significance of some gestures may be emphasized while others deemphasized. Further examples of the information in storage 210 may account for regional idiosyncrasies, e.g. persons of one region are more likely to use larger arm movements compared to persons of other regions, while showing the same level of interest, being less likely to use the same large arm movements. Similarly, information stored in feature information storage 207 may emphasize, for a given object, some features over others. For example, step-in height for trucks may be a relevant feature for trucks while non-existent for cars. Accordingly, the machine-learning models 206 and 209 may be adjusted based on specific environments and/or characteristics of specific persons.

The reduced list of features from server 201 may be associated with timestamps relating to timestamps of images from cameras 213. Similarly, identified gestures from sever 202 may be associated with timestamps relating to timestamps of images from cameras 213. Using the timestamps of the list of features and the identified gestures, individual features may be correlated with the gestures. Further, the gestures may be scored. The scoring may be as simple as positive/negative or as complex as degree of positive/degree of negative or even including showing levels of interest independent of positive and negative gestures. Using the combination of scored gestures and the identified features and common image timestamps, the identified features may be scored and the scored features provided on a results display device 215 (e.g., a computer screen, a printer configured to print the results to a paper document, or other tangible item) for use by salespersons. The display device 215 may or may not be present in the image capture environment 203. Further, in some use-cases, the display device 215 may be located apart from the environment 203 and used for training of salespersons.

For example, results display device 215 may include a computer (e.g., a desktop computer, a laptop computer, a tablet computer, a handheld computer, and/or the like), a mobile phone (e.g., a smart phone and/or the like), a television (e.g., a smart television), an interactive display screen, and/or a similar type of device. The results display device 215 may host the web browser or one or more applications that provide the results to a user. The web browser may be used to access information on the World Wide Web, such as web pages, images, videos, and/or other web resources. The web browser may access such web resources using a uniform resource identifier (URI), such as a uniform resource locator (URL), a uniform resource name (URN), and/or the like. Web browser may enable the results display device 215 to retrieve and present, for display, content of a web page.

The network 204 may include one or more wired and/or wireless networks. For example, network 204 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more servers shown in FIG. 2 may be implemented within a single server, or a single server shown in FIG. 2 may be implemented as multiple, distributed servers or in a cloud-based computing environment. Additionally, or alternatively, a set of devices (e.g., one or more devices) of the environment 203 may perform one or more functions described as being performed by another set of devices of the environment. Network 204 may be represented as a single network but may comprise combinations of other networks or subnetworks.

The feature identification machine-learning model 206 and the gesture identification machine-learning model 209 and any other machine-learning models described herein may be used to make predictions based on input information. One or more of the machine-learning models may be used to recognize a person in an image and the location and orientation of that person in the image. In some embodiments, one or more machine learning models (e.g., a machine-learning model in the computing device 211, the feature identification machine-learning model 206, and/or the gesture identification machine-learning model 209) may extract information from images using an image component extraction technique, such as scale-invariant feature transform (SIFT), speeded-up robust features (SURF), or an equivalent thereof. The one or more extracted image components may then be further analyzed by the first machine learning model or provided to a second machine learning model. The first machine learning model and/or the second machine learning model can be trained to recognize the one or more image components (e.g., the feature identification machine-learning model 206 may identify a line-of-sight/field-of-view of the person and/or the gesture identification machine-learning model 209 may identify a gesture of the person). The machine learning models may include a support vector machine, logistic regression, random forest, or an equivalent thereof. Additionally, or alternatively, the machine learning models may be a convolutional neural network, a recurrent neural network, a recursive neural network, a long short-term memory (LSTM), a gated recurrent unit (GRU), an unsupervised pre-trained network, a space invariant artificial neural network, or any equivalent thereof. In some embodiments, the machine learning models may be existing machine learning models. In further embodiments, the machine learning models may be proprietary models. Alternatively, the machine learning models may be modified existing machine learning models such that the machine learning models become proprietary. In some instances, the machine learning models may be trained using different parameters, such as back propagation, transfer learning, stochastic gradient descent, learning rate decay, dropout, max pooling, batch normalization, long short-term memory, skip-gram, and/or any equivalent deep learning technique. According to some embodiments, the machine learning models may generate a first baseline feature vector for the first image component. The first baseline feature vector may be used for verification purposes (e.g., as the verified feature to which subsequent verification attempts may be compared). In practice, the various computing devices and/or servers with the machine-learning models may obtain samples of image components until the machine learning models are able to recognize the desired image components. This training phase may be based on individuals walking in the environment while having their images and gestures captured. The machine learning models may then be provided with information of the lines of sights/fields of view of the individuals, their gestures, and their emotional reactions to features of the objects. Using this information, the machine-learning models may be trained or even further trained to refine the machine learning models.

With respect to the feature identification machine learning model 206, it may have been trained to recognize a feature of an object based on a line-of-sight/field-of-view of a person, objects hit by that line-of-sight/within that field-of-view, retrieving a scale associated with features of the objects, and scoring those features based on comparing their scale to the distance between the person and the respective objects. With respect to the gesture identification machine-learning model 209, it may have been trained to recognize facial expressions of individuals. The gesture identification machine learning model 209 and/or a facial expression/scoring machine-learning model may perform a variety of processes to arrive at conclusions from the input images including include edge detection (e.g., using a canny edge detection algorithm or holistically nested edge detection), determining global metrics for the images, derivation of metrics for each tile in the images, comparing upper and lower face halves, comparing across action units, principal component analysis PCA, and representational similarity analyses RSA.

In one or more embodiments, the computing devices and/or servers may use machine learning algorithms to perform the analysis of image information. The machine learning algorithms may be a neural network, such as a generative adversarial network (GAN) or a consistent adversarial network (CAN), such as a cyclic generative adversarial network (C-GAN), a deep convolutional GAN (DC-GAN), GAN interpolation (GAN-INT), GAN-CLS, a cyclic-CAN (e.g., C-CAN), or any equivalent thereof. The neural network may be trained using supervised learning, unsupervised learning, back propagation, transfer learning, stochastic gradient descent, learning rate decay, dropout, max pooling, batch normalization, long short-term memory, skip-gram, or any equivalent deep learning technique.

A process for identifying specific features of interest from a collection of possible features and associating customers' impressions associated with those features is described herein. As any object (e.g., an automobile) may have a number of possible features of interest, being able to differentiate between those features may provide salespersons with greater information about the customers' impressions of those features. A technical issue exists on how to differentiate between all possible features to find the most probable features associated with detected gestures from the customers. One or more aspects pertain to addressing this technical issue by associated features of objects with a scale. Based on the distance between a customer and the object, the set of possible features may be narrowed by prioritizing those features having a scale associated with the distance between the customer and the object. Based on the narrowed set of features, the customers' gestures may be associated with one or more of the narrowed set of features. In one or more additional aspects, later-captured gestures may refine the association between the customers' earlier gestures and the one or more of the narrowed set of features. For purposes of explanation, the process is described in the following sections: General Feature Identification, Specific Feature Identification, Results Generation, and Facial Expression Harvesting and Scoring.

General Feature Identification

Figure 3:
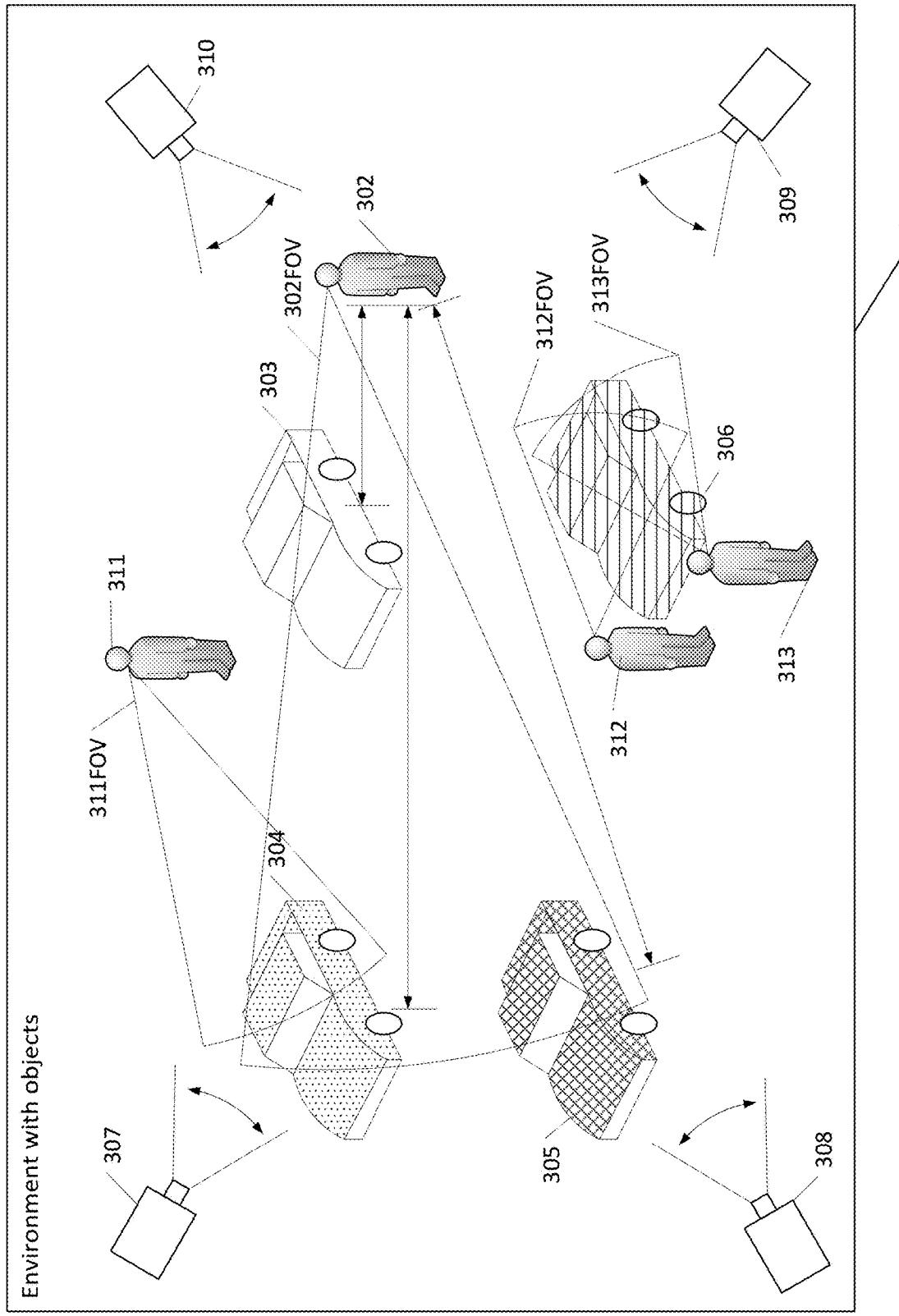
FIG. 3 depicts an environment with multiple objects and multiple image capturing devices with a person located at various distances from the respective objects.

FIG. 3 depicts an environment with multiple objects and multiple image capturing devices with a person located at various distances from the respective objects. An environment 301 may comprise a space configured to allow persons to view a plurality of objects where one or more systems monitor and/or draw inferences from the actions of the persons. In FIG. 3, a quantity of persons 302, 311, 312, and 313 are viewing a quantity of objects 303, 304, 305, and 306. For purposes of explanation, the objects 303, 304, 305, and 306 in the environment 301 are automobiles. It is appreciated that the objects 303, 304, 305, and 306 may be any object as described herein. As the persons 302, 311, 312, and 313 walk around and/or interact with the automobiles 303, 304, 305, and 306, their lines-of-sight, facial expressions, hand movements, body movements, gestures, and the like may be captured by one or more image capture devices 307, 308, 309, 310. A position of each of the automobiles 303, 304, 305, and 306 is known. For example, a processing system may identify the environment on a two-dimensional grid and/or in three-dimensional space. The automobiles 303, 304, 305, and 306 may be designated on the grid and/or space by their general location, their footprint, and/or specific dimensions on the grid and/or in the space.

The image capture devices may comprise still image cameras, video cameras, or a combination of still image cameras and video cameras. Each of the one or more image capture devices 307, 308, 309, 310 has its own field-of-view (FOV). To ensure the facial expressions and other actions of the persons 302, 311, 312, and 313 are accurately captured irrespective the direction the persons are facing, the image capture devices 307, 308, 309, 310 may be arranged such that their collective fields-of-view cover the environment 301. Additionally or alternatively, the image capture devices 307, 308, 309, 310 may be arranged at different heights to capture different types of information that may be more easily detectable from one vantage point compared to another. For instance, line-of-sight directions may be more readily obtainable from overhead image capture devices (e.g., pole-mounted, wall-mounted, and/or ceiling-mounted image capture devices) compared to image capture devices positioned at waist-level (e.g., placed on desks). For a given individual, one or more images of the person may be obtained that show a general direction in which the person is facing. The direction the person is facing may be determined as, for instance, a vector perpendicular to a line connecting the person's shoulders, a vector perpendicular to a plane of the person's face, and/or a vector perpendicular to a line connecting their ears or the like. Using the position of a person and the person's line-of-sight, a list of automobiles 303, 304, 305, and 306 within that person's line-of-sight at a given time may be determined. For a general determination of the automobiles 303, 304, 305, and 306 within the person's line-of-sight, the person may be identified as having a field-of-view of a number of degrees (e.g., 30°). The field-of-view may address inaccuracies associated with the determination of the person's line-of-sight. As shown in FIG. 3, the person 302 is shown having a field-of-view 302FOV, the person 311 is shown having a field-of-view 311FOV, the person 312 is shown having a field-of-view 312FOV, and the person 313 is shown having a field-of-view 313FOV. For the person 302, the field-of-view 302FOV encompasses portions of automobiles 303, 304, and 305. Based on a combination of the person 302's field-of-view 302FOV and the identification of the automobiles 303, 304, and 305, a list of features associated with each automobile may be identified with that person 302. For the other persons 311, 312, and 313, a list of features associated with the automobiles in their respective fields-of-view may be identified with the persons 311, 312, and 313 as well. Additionally or alternatively, the person's field-of-view may be determined by monitoring the person's line-of-sight as characterized by the sclera and iris and portions of each showing in the person's eye. In one example, a general field-of-view may be determined from the orientation of the person's head and the field-of-view refined based on the line-of-sight determined from the actual sight direction relating to where their eyes are looking.

The image capture devices 307, 308, 309, 310 may also capture image pertaining to pointing gestures of one or more of the persons 302, 311, 312, and 313. The directions of the pointing gestures may be stored as well with times at which the pointing gestures were captured. Similar to the determination of the line-of-sight/field-of-view determinations, the pointing gesture determinations may provide vectors from the persons. Automobiles in the path of those vectors may be associated with the persons. Also, features associated with those automobiles may also be associated with those pointing gestures.

In addition to determining a person's general field-of-view, a processing system may also determine, using the one or more image capture devices 307, 308, 309, 310, a location of a given person. The person's location may be an absolute position, a relative position in the environment, or a combination thereof. The positions of the automobiles 303, 304, 305, and 306 may be determined as well. The positions of the automobiles 303, 304, 305, and 306 may be previously determined and/or may be determined in combination with the determination of the positions of the persons 302, 311, 312, and 313.

Specific Feature Identification

The list of features, from the General Feature Identification process described above, may be sufficient in some situations such as where there are a limited number of features and a limited number of objects in the environment 301. However, where the objects contain numerous features, e.g., with automobiles and other complex objects, the list of features may be further analyzed to determine which of those features are associated with a gesture of a person. For example, a distance between a person and each automobile within that person's field-of-view may also be determined by determining the location of the person 302 relative to the grid/space, finding the location of the automobile or automobiles within that person's field-of-view or in the pointing direction of the pointing gesture, and determining a linear distance between the person and the respective automobile or automobiles.

The distance information may be used to further refine the list of features of the automobiles by increasing the relevance of those features corresponding to a distance between the person and the automobile, for instance, when the pointing gesture was made while similarly decreasing the relevance of those features that do not correspond to the distance between the person and the automobile at the time of the pointing gesture. The process of identifying specific features based on scale may be aggregated over time to identify, for a given person, which features of which automobiles are more often the subject of the person's gestures compared to other features. For instance, as the person moves about the environment 301, the combination of image capture devices 307, 308, 309, 310 may capture the person's gestures made at different times, determine the automobiles within that person's field-of-view and/or in the pointing direction of the pointing gesture, and determining a linear distance between the person and the respective automobile or automobiles. Based on the distance information and the scales of features of the automobiles, the features of each automobile may be weighted and combined with previous lists of weighted features to provide a composite list of features of interest to the person. Further, by identifying features over time as the person walks around the environment, the more salient features would arguably have been referenced more times than other features that were merely within the person's field-of-view/pointing direction only for a few instances and not others.

Figure 4:
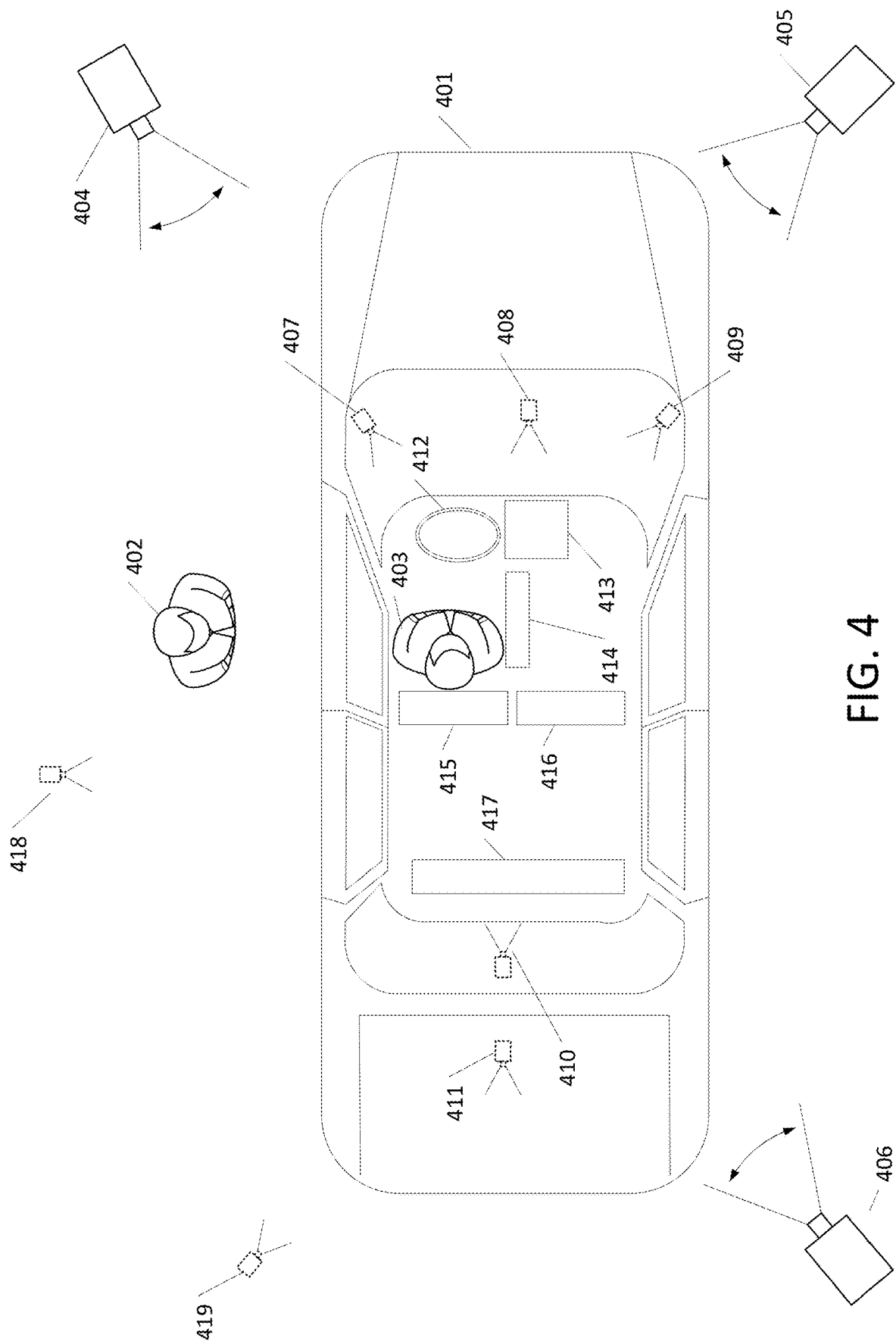
FIG. 4 depicts another view of the environment, specific to one of the objects in the environment of FIG. 3.

The general feature identification and specific feature identification processes may be performed based on the distances between persons and automobiles as shown in FIG. 3 but also may be performed in relation to a specific automobile as described in relation to FIG. 4. FIG. 4 depicts another view of the environment, specific to one of the objects (e.g., one of the automobiles) in the environment of FIG. 3. FIG. 4 includes an automobile 401 with a person 402 outside a driver's side door and a person 403 in the driver's seat. The environment includes elevated height image capture devices 404, 405, 406 and lower height image capture devices 418, 419. The elevated height image capture devices 404, 405, 406 may permit capture of images relating to a person's gestures relative to an upper portion of the automobile 401 while the lower height image capture devices 418, 419 may permit capture of images relating to the person's gestures relating to a lower portion of the automobile 401. Further, image capture devices 407, 408, 409 on a dashboard of the vehicle may capture gestures of persons in the front seats of the automobile 401 including interactions with a dashboard 413, console 414, and seats 415, 416. Image capture device 410 may capture gestures of persons in the back seat 417 as they face to the rear of the automobile 401. Image capture device 411 may capture gestures of a person interacting with features of the automobile inside the trunk.

Results Generation

Information relating to the resulting list of features most often identified by a person may be summarized and stored. In the car showroom example, the resulting list of features for one or more potential customers in the environment may be generated as new gestures are noticed and features identified or may be generated after a given time (e.g., 10 minutes or so) or upon request. A report may be beneficial for a salesperson as it permits the salesperson to focus conversations with the potential customer more quickly and completing sales more quickly than otherwise possible. Further, the dealership may become more efficient and require fewer salespersons to cover the showroom. This efficiency may be accomplished by providing each salesperson with more customer information with less personal involvement. Because each salesperson becomes more efficient, fewer salespersons may be required.

Further, information gathered from the list of features and the gestures used to identify those features may be used to train one or more machine learning models to improve their predictions of which features of which objects are being identified based on specific gestures. The training of the machine learning models may be consistent for other locations in which features predictions are being made. Additionally or alternatively, the training of the machine learning models may include other training information that varies for some of the trainings. For instance, the other training information may include information associated with the types of objects (e.g., cars compared to trucks compared to motorcycles and/or make and models of the vehicles), the location of another environment (e.g., where some types of gestures are more often noticed compared to others), gender information (e.g., where one gender may be more prone to one type of gestures compared to another), and the like. The trained model or models may be subsequently distributed (or made available) for use by systems monitoring other environments with a collection of their own objects.

Facial Expression Harvesting and Scoring

In some environments, using pointing gestures may be sufficient to adequately provide information to salespersons of the features of interest to particular persons in the environment. In other environments, a preference information may be useful to help the salesperson identify how a particular person feels about a given feature. For example, facial expressions may be monitored. For facial expressions that may be indicative of an emotion, those facial expressions may be timestamped and stored for scoring of the expression. Facial expressions that may be indicative of an emotion may include raising of one or both eyebrows, widening of eyes/squinting, pursing/biting of lips, and the like. Examples of emotions that may be expressed by facial expressions may comprise amusement, inquisitiveness, contempt, contentment, embarrassment, excitement, guilt, pride, relief, satisfaction, sensory pleasure, shame, and/or other emotions. Machine-learning models may be used to evaluate facial expressions. For example, a first machine-learning model may be used to predict when a facial expression has occurred. The predictions from the first machine-learning model may be stored along with a timestamp associated with the gesture. A second machine learning model may be used to score the expression based on a type of emotion associated with the expression. The scored expression may be stored along with the timestamp.

The scored expressions may be combined with the identified features to weight the priority of the listed features. Further, in some situations, specific expressions may be associated more closely with one type of feature than another. This association may help further refine which specific feature is relevant to a gesture. For example, pursing of lips may be associated with a silhouette of a vehicle where the silhouette feature is more readily identifiable at a distance, and thus have a macro scale. A person, pursing their lips, may be standing in front of a first automobile and looking at the silhouette of a second automobile. The person's field-of-view may encompass both vehicles. A gesture (pursing of lips) may be identified. Based on the pursing of the lips gesture being more closely associated with a silhouette feature of an automobile object and that the silhouette feature is more often associated with distance from the person, the system may associate the pursing of lips gesture with the silhouette feature of the second automobile, even though features of the first automobile are closer to the person than the features of the second automobile.

Further, in some examples, a length of time a facial expression is exhibited may also be stored. The inclusion of the length of time the facial expression has been exhibited may be useful in increasing the significance of the emotion associated with the identified feature. For example, if a person was grimacing for a moment, any feature associated with that grimace may be associated with a slightly negative emotional value of that person. For instance, on a scale of −10 to +10 with −10 being a strong negative reaction and +10 being a strong positive reaction, the grimace for a moment may receive a −2 rating for any feature associated with the grimace. However, if the person is grimacing for an extended period of time (e.g., 10 seconds or longer), the rating may be more negative (e.g., −6) for that feature.

Environment Monitoring and Feature Scoring

Figure 5:
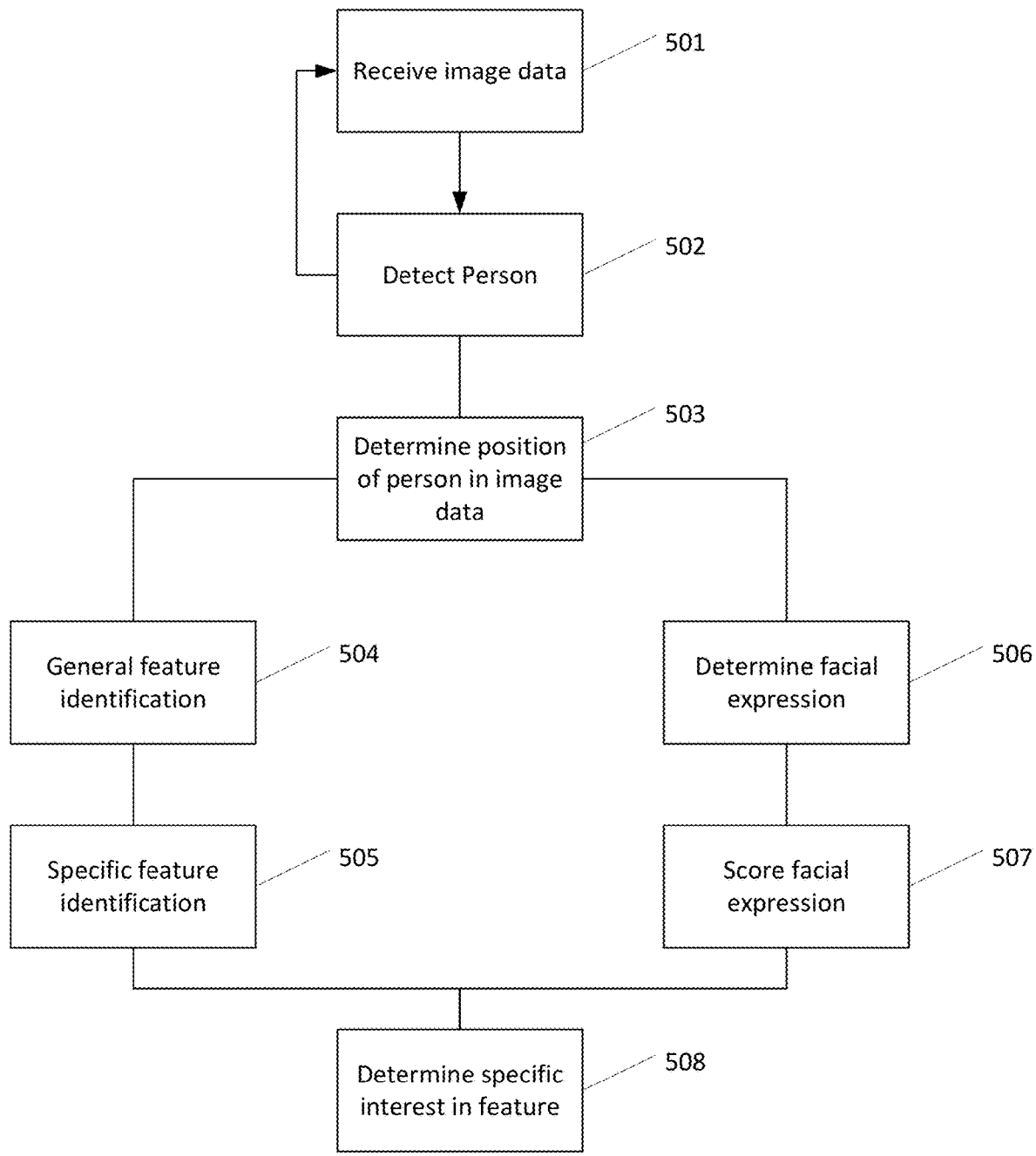
FIG. 5 is an example of a process for determining specific gestures and the features associated with those gestures.

Based on the above description, the following describes one or more examples of how including the General Feature Identification, Specific Feature Identification, Results Generation, and Facial Expression Harvesting and Scoring may be used to provide feature scores based on captured images of persons in an environment. FIG. 5 is an example of a process for determining specific gestures and the features associated with those gestures. In step 501, image data of persons in an environment may be received, for example, from one or more image capture devices. The image data may include objects within the environment and interactions and/or gestures of the persons with the objects. In step 502, a person may be detected in the image data. If no person has been detected, the process returns to receiving image data. In step 503, a position of the person may be determined. For example, the position of the person may be obtained by observing the location of the person's feet relative to objects in the environment, by observing a position of the person from an overhead image sensor above the person, and/or by other techniques known in the image processing art. In step 504, based on the position of the person in the image, general features of interest to the person may be determined. The person may perform one or more gestures while in the environment. The system may recognize the person's actions as a gesture and associate a timestamp with the gesture. Based on the timestamp, the line-of-sight/field-of-view of the person, from the person's position, may be determined. The objects in the person's line-of-sight may be obtained as well as the features associated with each of those objects. For instance, the line-of-sight may be represented as a vector and/or the field-of-view may be represented by a vector field. Any objects within the path of the vector or the vector field may be determined to be a general object of interest and any feature of that object to be a general feature of interest.

In step 505, the general features of interest may be narrowed to specific features of interest by aggregating multiple designations of general features of interest from different positions/different lines-of-sight/different fields-of-view of the person. By combining the general features of interest over time, specific features of interest may be identified as having been associated more frequently with the person's line-of-sight/field-of-view at the times associated with the person's gestures.

In step 506, a facial expression is determined to have been made by the person. The determination may be made by a machine learning model trained on data sets showing changes in facial expressions (e.g., machine learning models trained on affect-related expressions). In step 506, the facial expressions may be scored. The scoring may comprise a linear scale (e.g., −10 to +10 or any other linear range) and/or may comprise multi-dimensional scoring in which multiple emotions may be identified simultaneously (e.g., amusement, inquisitiveness, contempt, contentment, embarrassment, excitement, guilt, pride, relief, satisfaction, sensory pleasure, shame, and/or other emotions). In the multi-dimensional scoring examples, the identified emotions may be kept in the originally identified groups and/or simplified based on applicability to the end result of associating a facial expression with a particular feature of an object. For instance, the emotions of contempt, embarrassment, guilt, shame or other negative emotions may be collectively referred to as a negative impression of a feature, the emotions of amusement, contentment, pride, relief, satisfaction, excitement, and sensory pleasure may be collectively referred to as a positive impression of the feature, and the emotions of inquisitiveness and excitement may be collectively referred to as an inquisitive impression of the feature.

In step 508, the results from the specific feature identification in step 505 and the scoring of the facial expression in step 507 may be combined to score the specific features. The scoring may be linear scoring (e.g., using a single scale from a negative impression to a positive impression) and/or may be a multi-dimensional score (e.g., corresponding to the identified emotions in step 506 and scored in step 507). Further, in the example of the simplification of the multi-dimensional scoring, a possible scoring may comprise ranges of attraction, repulsion, and/or inquisitiveness. Additionally or alternatively, the scorings of the features may include how those scorings changed over time. For instance, while a person may have been initially repulsed by a color of a vehicle, the person may have warmed to the color and, in later images, is attracted to it.

Figure 6:
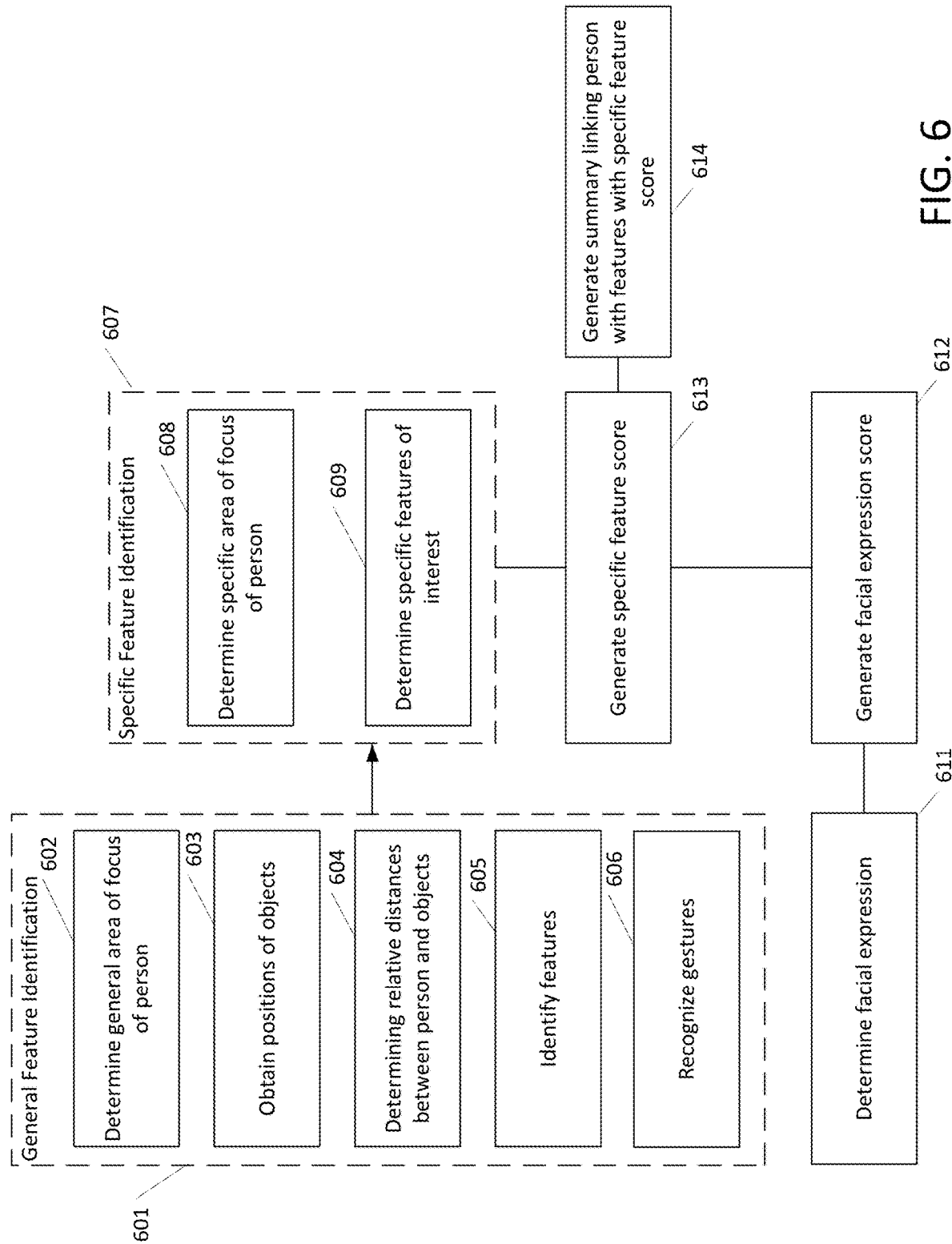
FIG. 6 is another example of a process for determining specific gestures and the features associated with those gestures.

FIG. 6 is another example of a process for determining specific gestures and the features associated with those gestures. FIG. 6 shows a general feature identification step 601 comprising other steps. For example, in step 602, a general area of focus of a person may be determined from analyzing one or more images and identifying a line-of-sight and/or field-of-view of the person. In step 603, the positions of the objects may be obtained—dynamically from comparing images or from a storage where the object locations have been previously stored. In step 604, distances between the person and the objects may be determined. In step 605, features of the objects may be determined based on the focus of the person and the objects in the path of the person's focus. The features of the objects in the focus of the person are obtained. In step 606, images of the person may be monitored to determine when the person has made a gesture. The gestures may comprise pointing, turning one's head and nodding, raising or lowering one's gaze, and/or other gestures that show interest in a general direction of one or more objects.

In step 607, specific features may be identified. Step 607 may comprise a number of other sub steps comprising step 608 in which the system determines a specific area of focus of a person and step 609 in which the system determines specific features of interest associated with the specific areas of focus of the person. In step 611, facial expressions may be determined for the person. In step 612, the determined facial expressions may be scored to identify, among other things, specific times when the person was expressing attraction, repulsion and/or interest. In step 613, the specific features identified in step 609 may be combined with the facial expression score from step 612 to determine a specific feature score for a specific feature of an object. In step 614, a summary may be generated linking the person with features in the environment and a specific feature score associated with those features.

Figure 7:
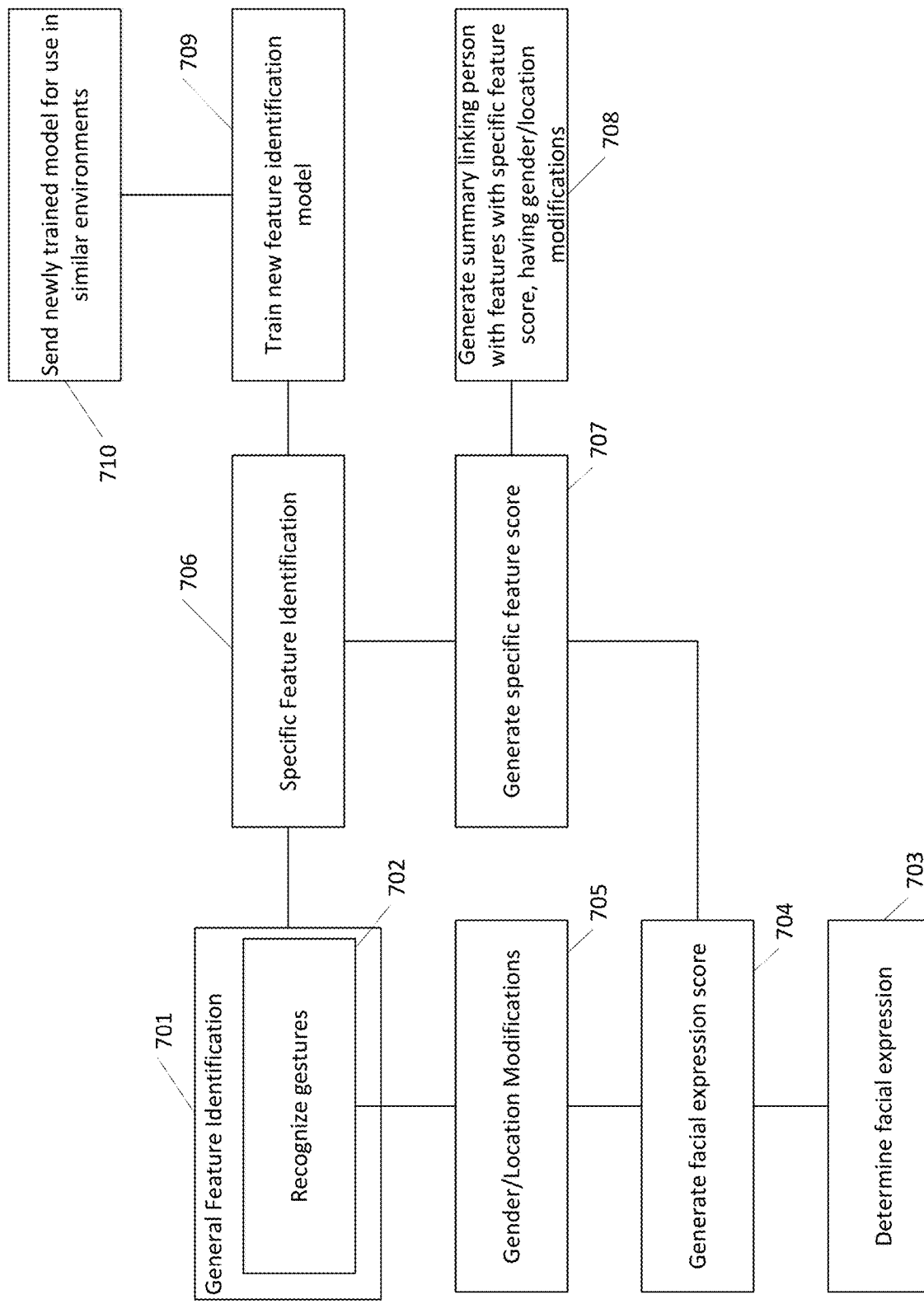
FIG. 7 is yet another example of a process for determining specific gestures and the features associated with those gestures.

FIG. 7 is yet another example of a process for determining specific gestures and features associated with those gestures. In step 701, general features of objects in an environment may be identified. Part of the general feature identification of step 701 is the recognition of gestures 702. Based on the recognized gestures of step 702, objects within the person's field-of-view at the time of the gestures may be identified. Based on the identified objects, identifications of features associated with those objects may be obtained. In step 706, specific features may be identified based on a combination of the identified objects associated with multiple gestures (identified in step 702).

In step 703, a facial expression of the person may be determined. As described herein, the facial expression may be determined through using one or more machine learning models trained on recognizing facial expressions from facial data. In step 704, facial expression scores may be generated for the facial expressions determined in step 703.

In the example of FIG. 7, the gestures recognized in step 702, what constitutes a facial expression in step 703, and/or a score associated with a facial expression from step 704 may be modified based on information from step 705. Step 705 may comprise modifications of what constitutes gestures and/or facial expressions and what those gestures and facial expressions are intended to mean. For instance, the information from step 705 may comprise gender information and/or location information that may be used to modify what constitutes gestures and facial expressions and how those facial expressions are scored.

For example, the information from step 705 may comprise additional training information to be used when training machine learning models that detect the gestures in step 702, the machine learning models that detect the facial expressions in step 703, and/or the machine learning models that score the facial expressions in step 704. In step 707, the specific identified features from step 706 may be combined with the facial expression scores from step 704 to generate a composite scored set of features of the objects in the environment. In step 708, a summary may be generated linking the person with the features having the specific feature scores as modified by the gender/location modifications. Further, in step 709, based on the specific feature identifications from step 706, new feature identification models may be trained to identify specific features to improve the machine learning model used to recognize the gestures in step 702 that were used to identify the specific features from step 706. In step 710, newly trained machine learning models may be made available and/or distributed to similar environments having similar objects in order to improve the recognition of specific features based on gestures of persons in those similar environments.

Figure 8:
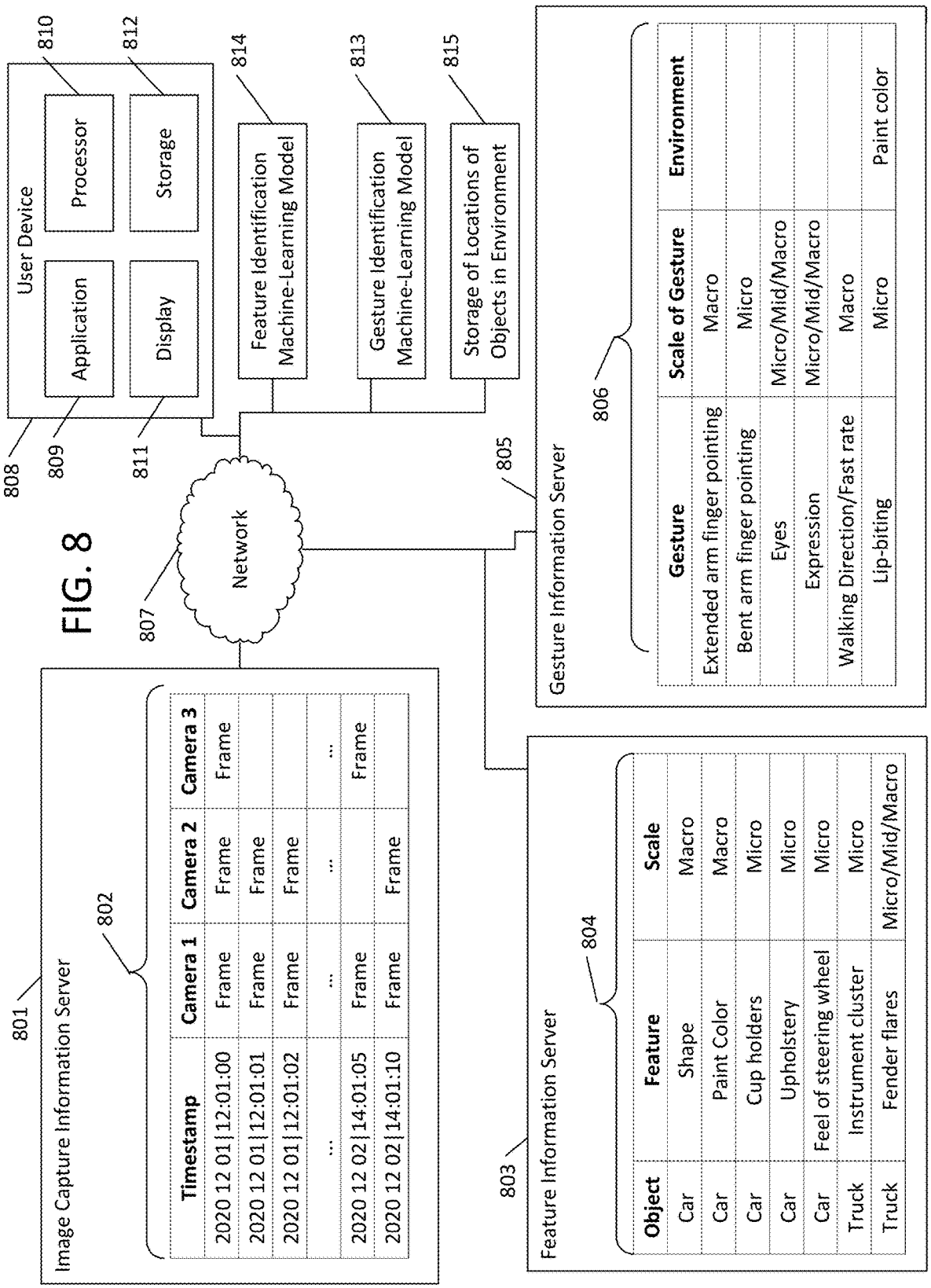
FIG. 8 is a block diagram of a network integrating image capture information, feature information, and gesture information for analysis via one or more machine-learning models.

FIG. 8 is a block diagram of a network integrating image capture information, feature information, and gesture information for analysis via one or more machine-learning models. FIG. 8 includes image capture information server 801 configured to store image content (e.g., frames of still images and/or videos) from a plurality of cameras. For purposes of explanation, FIG. 8 is described in terms of storing frames of image content. However, it is appreciated that videos are also able to be stored. Unless otherwise differentiated, the use of the term "frame" is intended to cover both still images as well as video segments.

The image capture information server 801 may comprise one or more processors and memory. As shown in FIG. 8, image information from a plurality of cameras (e.g., camera 1, camera 2, and camera 3) is stored in a database 802 in which frames from the cameras are associated with a timestamp. As shown in FIG. 8, frames from camera 1 are captured continuously and the frames stored in database 802. However, only some frames from each of cameras 2 and camera 3 are stored. In some instances, all frames from image capture devices are stored. In others instances, less than all images may be stored. Additionally or alternatively, the image capture devices may include motion detection capabilities to only capture images where there is movement in front of the camera. Additionally or alternatively, information from the image capture devices may be processed to only store frames in which there is movement and at least one person has been detected in the frames.

FIG. 8 further comprises feature information server 803 that is configured to store information relating to features associated with objects. A database 804 may comprise fields associating objects with features and a scale with which a respective feature is more closely associated. For instance, a car object may comprise a number of features including shape of the car (a.k.a. a car's silhouette), a paint color of the car, cupholders in the car, upholstery in the car, and feel of a steering wheel. Each of these features may be their own features or may comprise of features as well (e.g., the upholstery feature may comprise sub features relating to types of seating surfaces, color combinations, and/or stitching). Further, a scale (e.g., a distance between the feature and a person commenting on that feature) associated with the feature may be stored as well in database 804. For example, the shape/silhouette feature of the car is associated with macro scale (e.g., a far viewing distance), the paint color feature of the car is associated with a macro scale, the cupholders feature of the car is associated with a micro scale (e.g., a near viewing distance), the upholstery feature of the car is associated with the micro scale, and the feel of the steering wheel feature is associated with the micro scale. Further, other types of objects and their associated features and scales may also be stored in database 804 (e.g., truck objects with instrument cluster features and fender flare features and scales associated with each). The scales associated with the features may comprise values that describe specific scales. The specific scales may be associated with ranges and/or thresholds. Additionally or alternatively, the scales associated with features may comprise a number of designations of ranges (e.g., truck fender flares may be associated with micro, middle, and macro scales).

FIG. 8 further comprises a gesture information server 805 that includes a database 806 that associates gestures and scales to features referenced by those gestures. Sample gestures/scale of the gestures may comprise extended arm finger pointing/macro scale, bent arm finger pointing/micro scale, moving eyes independent of facing direction of head/{micro, middle, macro} scales, facial expressions/{micro, middle, macro} scales, walking direction and elevated rate/macro scale, and lip-biting/micro scale. Further, some gestures may be particularly relevant to some environments (e.g., lip-biting may be associated with a micro scale and relating to a reaction to paint color).

FIG. 8 further comprises one or more machine learning models. A machine learning model 813 may be trained on data associating gestures with image content showing actions of persons. Using the machine learning model 813, the system may predict, for a person in image information 802, that a gesture from database 806 has been made. A machine-learning model 814 may be trained on data associating a gesture with a particular feature of an object. Using machine-learning model 814, the system may predict which feature, from database 804, is being referenced by a person making a gesture based on the line-of-sight/field-of-view of the person and the distance between the person and the object containing the features. Further, the machine learning model 813 or the machine learning model 814 may further comprise another machine learning model that has been trained to make predictions of when a person is present in an image and the location of that person in the environment where the images were captured. The person detection machine learning model may be part of the gesture identification machine learning model 813, part of the feature identification machine learning model 814, or may be a separate machine learning model.

FIG. 8 may also comprise a storage 815 configured to store locations of objects in one or more environments for which images are captured of persons making gestures relating to the objects. The object locations from storage 815 may be used by the feature identification machine learning model 814 and/or by the gesture identification machine learning model 813. Using the locations of the objects, the features related to persons' gestures may be predicted. FIG. 8 may further comprise a user device 808 that may be used to output results, to a user (e.g., a salesperson), identifying persons and objects of interest to those persons. Additionally or alternatively, the user device 808 may output reactions (e.g., positive, negative, inquisitive, and the like) to the user. The user device 808 may comprise one or more processors 810, storage 812, and one or more applications 809 that are configured to receive predictions of the machine learning models 813, 814 and provide those predictions to the user.

Thus, a computer-implemented method may comprise receiving, by a first device, image data comprising a person in an environment, wherein the environment comprises objects with each object comprising one or more features; detecting the person in the image data; determining a position of the person within the environment; predicting, via a machine learning model trained to recognize a line-of-sight, a general area of focus of the person; determining positions of the objects in the environment; determining relative distances between the position of the person and the objects; and identifying, based on the predicted general area of focus, based on positions of the objects in the environment, and based on the relative distance between the position of the person and the objects, a collection of one or more features. The method may further comprise recognizing, via a machine learning model trained to recognize gestures, one or more gestures, wherein each of the one or more gestures is associated with a timestamp; determining, based on the recognized one or more gestures and their associated timestamps, a specific area of focus of the person; determining, based on the collection of one or more features and based on the specific area of focus, one or more specific features; determining, based on a first gesture of the one or more recognized gestures of the person and the one or more specific features, specific features of interest to the person; determining, from the image data and based on a first timestamp associated with the first gesture, a facial expression of the person; generating, based on the facial expression of the person, a score associated with the specific features of interest to the person; and outputting, based on the score, an indication of the person's level of interest in the specific features of interest.

Further, in some aspects, the method may comprise recognizing the one or more gestures including recognizing one or more pointing gestures. The determining the specific area of focus of the person may comprise determining, based on the recognized one or more pointing gestures and their associated timestamps, the specific area of focus of the person. One or more of the features may be classified as a macro-scale focus, a micro-scale focus, or a combination of macro-scale focus and micro-scale focus. The method may further comprise determining, based on the classifications of the features and the relative distances between the person and the features, the one or more specific features. The recognition of a gesture may comprise predicting, via a machine learning model trained on associating features and specific gestures, possible features associated with the recognized gesture, wherein the machine learning model was trained on associating features and specific gestures using historical data relating gestures to certain features as opposed to other features. Some aspects of the method may further comprise modifying, based on one or more of an identified gender of the person or a location of the environment, the machine learning model trained on associating features and specific gestures and predicting, via the modified machine learning model trained on associating features and specific gestures, the score for the facial expression. The scoring of facial expressions may comprise predicting, via a machine learning model trained to recognize facial gestures and based on the image data across the expression timestamps, the facial expressions. The predicting of facial expressions may further comprise identifying a specific timestamp of the expression timestamps; and associating the identified specific expression timestamp with the facial expression. The determining of the facial expression may comprise predicting, via a machine learning model trained to score facial expressions, a score for the facial expression with the score as one of a positive score, a negative score, or an inquisitive score. Further, the score may comprise a numerical value. Determining the score may further comprise modifying, based on one or more of an identified gender of the person or a location of the environment, the gesture scoring machine learning model; and predicting, via the modified machine learning model trained to score facial expressions, the score for the facial expression.

Some aspects of the method may further comprise outputting, for each feature of interest, a score comprising a value and a reaction category. The reaction category may comprise, for each feature of interest, a positive reaction, a negative reaction, or an inquisitive reaction. The method may further comprise receiving, by the first device, second image data comprising a second person in a second environment, wherein the second environment may comprise one or more second objects with each second object comprising one or more features; generating, from a second facial expressions of the second person a second score associated with second specific features of interest to the second person; and outputting, based on the second score, a second indication of the second person's level of interest in the second specific features of interest. Some aspects of the method may further comprise outputting one or more machine learning models for making predictions based on other persons in other environments.

An apparatus may comprise one or more processors; and memory storing instructions that, when executed by the one or more processors, cause the apparatus to receive, by a first device, image data comprising a person in an environment, wherein the environment may comprise objects with each object comprising one or more features, wherein the one or more features are classified as a macro-scale focus, a micro-scale focus, or a combination of macro-scale focus and micro-scale focus; detect the person in the image data; determine a position of the person within the environment; predict, via a machine learning model trained to recognize a line-of-sight, a general area of focus of the person; determine positions of the objects in the environment; determine relative distances between the position of the person and the objects; identify, based on the predicted general area of focus, based on positions of the objects in the environment, based on the classification of the features, and based on the relative distance between the position of the person and the objects, a collection of one or more features; recognize, via a machine learning model trained to recognize gestures, one or more gestures, wherein each of the one or more gestures is associated with a timestamp; determine, based on the recognized one or more gestures and their associated timestamps, a specific area of focus of the person; determine, based on the collection of one or more features and based on the specific area of focus, one or more specific features; determine, based on a first gesture of the one or more recognized gestures of the person and the one or more specific features, specific features of interest to the person; determine, from the image data and based on a first timestamp associated with the first gesture, a facial expression of the person; generate, based on the facial expression of the person, a score associated with the specific features of interest to the person; and output, based on the score, an indication of the person's level of interest in the specific features of interest.

In some aspects, the instructions may further cause the apparatus to predict, via a machine learning model trained to associate gestures with features, possible features associated with specific gestures, wherein the machine learning model trained to associate gestures with features was trained using historical data relating gestures to certain features as opposed to other features. The instructions may further cause the apparatus to modify, based on one or more of an identified gender of the person or a location of the environment, the machine learning model trained to associate gestures with features; and predict, via the modified machine learning model trained to associate gestures with features, the score for the facial expression. The instructions may further cause the apparatus to predict, via a machine learning model trained to recognize facial gestures and based on the image data across the associated expression timestamps, the facial expression. The instructions may further cause the apparatus to identify a specific timestamp; and associate the identified specific timestamp with the facial expression.

One more non-transitory media storing instructions that, when executed by one or more processors, may cause the one or more processors to perform steps comprising. receiving, by a first device, image data comprising a person in an environment, wherein the environment may comprise objects with each object comprising one or more features; detecting the person in the image data; determining a position of the person within the environment; predicting, via a machine learning model trained to recognize a line-of-sight, a general area of focus of the person; determining positions of the objects in the environment; determining relative distances between the position of the person and the objects; identifying, based on the predicted general area of focus, based on positions of the objects in the environment, and based on the relative distance between the position of the person and the objects, a collection of one or more features; recognizing, via a machine learning model trained to recognize gestures, one or more gestures, wherein each of the one or more gestures is associated with a timestamp; determining, based on the recognized one or more gestures and their associated timestamps, a specific area of focus of the person; determining, based on the collection of one or more features and based on the specific area of focus, one or more specific features; determining, based on a first gesture of the one or more recognized gestures of the person and the one or more specific features, specific features of interest to the person; determining, from the image data and based on a first timestamp associated with the first gesture, a facial expression of the person; generating, based on the facial expression of the person, a score associated with the specific features of interest to the person; and outputting, based on the score, an indication of the person's level of interest in the specific features of interest, wherein the indication of the person's level of interest may comprise a score including a value and a reaction category, and wherein the reaction category may comprise, for each feature of interest, a positive reaction, a negative reaction, or an inquisitive reaction.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
    receiving, by a first device, image data comprising a person in an environment, wherein the environment comprises objects with each object comprising one or more features;
    detecting the person in the image data;
    determining a position of the person within the environment;
    predicting, based on a determination of the position of the person and via a machine learning model trained to recognize a line-of-sight, a general area of focus of the person;
    determining positions of the objects in the environment;
    determining relative distances between the position of the person and the positions of the objects;
    identifying, based on the predicted general area of focus, based on the positions of the objects in the environment, and based on the relative distances between the position of the person and the positions of the objects, a collection of one or more features;
    recognizing, based on the image data and via a machine learning model trained to recognize gestures, one or more gestures, wherein each of the one or more gestures is associated with a timestamp;
    determining, based on the recognized one or more gestures and their associated timestamps, a specific area of focus of the person;
    determining, based on the collection of one or more features and based on the specific area of focus, one or more specific features;
    determining, based on a first gesture of the one or more recognized gestures of the person and the one or more specific features, specific features of interest to the person;
    determining, from the image data and based on a first timestamp associated with the first gesture, a facial expression of the person;
    generating, based on the facial expression of the person, a score associated with the specific features of interest to the person; and
    outputting, based on the score, an indication of a level of interest, of the person, in the specific features of interest.

2. The computer-implemented method of claim 1, wherein recognizing the one or more gestures comprises recognizing one or more pointing gestures, and
    wherein determining the specific area of focus of the person is further based on the recognized one or more pointing gestures and their associated timestamps.

3. The computer-implemented method of claim 1, wherein the one or more features are classified as a macro-scale focus, a micro-scale focus, or a combination of macro-scale focus and micro-scale focus, and wherein determining the one or more specific features is further based on the classifications of the features.

4. The computer-implemented method of claim 1, wherein the determining the specific features comprises:
    predicting, via a machine learning model trained on associating features and specific gestures, possible features associated with the recognized gesture,
    wherein the machine learning model trained on associating features and specific gestures was trained using historical data relating gestures to certain features as opposed to other features.

5. The computer-implemented method of claim 4, wherein the determining the specific features further comprises:
    modifying, based on one or more of an identified gender of the person or a location of the environment, the machine learning model trained on associating features and specific gestures; and
    predicting, via the modified machine learning model trained on associating features and specific gestures, the specific features of interest.

6. The computer-implemented method of claim 1, wherein determining the facial expression comprises:
    predicting, via a machine learning model trained to recognize facial gestures and based on the first gesture, the facial expression.

7. The computer-implemented method of claim 6, wherein the predicting the facial expression comprises:
    identifying a first timestamp of the associated timestamps; and
    associating the first timestamp with the facial expression.

8. The computer-implemented method of claim 1, wherein generating the score comprises:
    predicting, via a machine learning model trained to score facial expressions, the score,
    wherein the score comprises one of a positive score, a negative score, or an inquisitive score.

9. The computer-implemented method of claim 8, wherein the score further comprises a numerical value.

10. The computer-implemented method of claim 8, wherein generating the score further comprises:
    modifying, based on one or more of an identified gender of the person or a location of the environment, the machine learning model trained to score facial expressions; and
    predicting, via the modified machine learning model trained to score facial expressions, the score.

11. The computer-implemented method of claim 1, wherein outputting the indication of the level of interest in the specific features of interest comprises:
    outputting, for each feature of interest, a specific score comprising a value and a reaction category.

12. The computer-implemented method of claim 11, wherein the reaction category comprises, for each feature of interest, one or more of:
    a positive reaction;
    a negative reaction; or
    an inquisitive reaction.

13. The computer-implemented method of claim 1, further comprising:
    receiving, by the first device, second image data comprising a second person in a second environment, wherein the second environment comprises one or more second objects with each second object comprising one or more features;
    generating, from a second facial expression of the second person, a second score associated with second specific features of interest to the second person; and outputting, based on the second score, a second indication of a level of interest of the second person in the second specific features of interest.

14. The computer-implemented method of claim 1, further comprising:
outputting one or more machine learning models for making predictions based on other persons in other environments.

15. An apparatus comprising:
one or more processors; and
memory storing instructions that, when executed by the one or more processors, cause the apparatus to:
receive, by a first device, image data comprising a person in an environment, wherein the environment comprises objects with each object comprising one or more features, wherein the one or more features are classified as a macro-scale focus, a micro-scale focus, or a combination of macro-scale focus and micro-scale focus;
detect the person in the image data;
determine a position of the person within the environment;
predict, based on a determination of the position of the person and via a machine learning model trained to recognize a line-of-sight, a general area of focus of the person;
determine positions of the objects in the environment;
determine relative distances between the position of the person and the positions of the objects;
identify, based on the predicted general area of focus, based on the positions of the objects in the environment, based on classification of the features, and based on the relative distances between the position of the person and the positions of the objects, a collection of one or more features;
recognize, based on the image data and via a machine learning model trained to recognize gestures, one or more gestures, wherein each of the one or more gestures is associated with a timestamp;
determine, based on the recognized one or more gestures and their associated timestamps, a specific area of focus of the person;
determine, based on the collection of one or more features and based on the specific area of focus, one or more specific features;
determine, based on a first gesture of the one or more recognized gestures of the person and the one or more specific features, specific features of interest to the person;
determine, from the image data and based on a first timestamp associated with the first gesture, a facial expression of the person;
generate, based on the facial expression of the person, a score associated with the specific features of interest to the person; and
output, based on the score, an indication of a level of interest, of the person, in the specific features of interest.

16. The apparatus of claim 15, wherein the instructions to determine the specific features further cause the apparatus to:
predict, via a machine learning model trained to associate gestures with features, possible features associated with specific gestures, wherein the machine learning model trained to associate gestures with features was trained using historical data relating gestures to certain features as opposed to other features.

17. The apparatus of claim 16, wherein the instructions to determine the specific features further cause the apparatus to:
modify, based on one or more of an identified gender of the person or a location of the environment, the machine learning model trained to associate gestures with features; and
predict, via the modified machine learning model trained to associate gestures with features, the specific features of interest.

18. The apparatus of claim 15, wherein the instructions to determine the facial expression further cause the apparatus to:
predict, via a machine learning model trained to recognize facial gestures and based on the first gesture, the facial expression.

19. The apparatus of claim 15, wherein the instructions to determine the facial expression further cause the apparatus to:
identify a first timestamp; and
associate the first timestamp with the facial expression.

20. One or more non-transitory media storing instructions that, when executed by one or more processors, cause the one or more processors to perform steps comprising:
receiving, by a first device, image data comprising a person in an environment, wherein the environment comprises objects with each object comprising one or more features;
detecting the person in the image data;
determining a position of the person within the environment;
predicting, based on a determination of the position of the person and via a machine learning model trained to recognize a line-of-sight, a general area of focus of the person;
determining positions of the objects in the environment;
determining relative distances between the position of the person and the positions of the objects;
identifying, based on the predicted general area of focus, based on the positions of the objects in the environment, and based on the relative distances between the position of the person and the positions of the objects, a collection of one or more features;
recognizing, based on the image data and via a machine learning model trained to recognize gestures, one or more gestures, wherein each of the one or more gestures is associated with a timestamp;
determining, based on the recognized one or more gestures and their associated timestamps, a specific area of focus of the person;
determining, based on the collection of one or more features and based on the specific area of focus, one or more specific features;
determining, based on a first gesture of the one or more recognized gestures of the person and the one or more specific features, specific features of interest to the person;
determining, from the image data and based on a first timestamp associated with the first gesture, a facial expression of the person;
generating, based on the facial expression of the person, a score associated with the specific features of interest to the person; and outputting, based on the score, an indication of a level of interest, of the person, in the specific features of interest, wherein the indication of the level of interest of the person comprises a score comprising a value and a reaction category, and wherein the reaction category comprises, for each feature of interest, one or more of:
- a positive reaction;
- a negative reaction; or
- an inquisitive reaction.

* * * * *